United States Patent [19]

Schwartz et al.

[11] 4,331,456
[45] May 25, 1982

[54] PROCESS FOR RECOVERING HYDROCARBONS WITH AIR-HYDROCARBON VAPOR MIXTURES

[75] Inventors: Robert E. Schwartz; Harold L. Dinsmore, both of Tulsa; Donald J. Peters, Broken Arrow; Gary W. Long, Tulsa, all of Okla.

[73] Assignee: John Zink Company, Tulsa, Okla.

[21] Appl. No.: 163,587

[22] Filed: Jun. 27, 1980

Related U.S. Application Data

[63] Continuation of Ser. No. 46,765, Jun. 8, 1979, Pat. No. 4,261,716.

[51] Int. Cl.³ .............................................. B01D 53/04
[52] U.S. Cl. ......................................... 55/26; 55/58; 55/62; 55/74; 55/88
[58] Field of Search ................... 55/25, 26, 58, 62, 74, 55/88, 179, 180, 387

[56] References Cited

U.S. PATENT DOCUMENTS

| | | | |
|---|---|---|---|
| 2,273,350 | 2/1942 | Fry et al. | 55/58 X |
| 3,037,338 | 6/1962 | Thomas | 55/58 |
| 3,176,444 | 4/1965 | Kiyonaga | 55/58 X |
| 3,225,518 | 12/1965 | Skarstrom et al. | 55/62 |
| 3,355,860 | 12/1967 | Arnoldi | 55/179 X |
| 3,455,089 | 7/1969 | Mattia | 55/62 |
| 3,543,484 | 12/1970 | Davis | 55/387 |
| 3,720,042 | 3/1973 | Simonet | 55/62 X |
| 3,768,232 | 10/1973 | Farber et al. | 55/58 |
| 3,776,283 | 12/1973 | Kramer et al. | 55/387 X |
| 3,867,111 | 2/1975 | Knowles | 55/88 X |
| 3,897,193 | 7/1975 | Kattan et al. | 55/387 X |
| 4,056,369 | 11/1977 | Quackenbush | 55/58 |
| 4,066,423 | 1/1978 | McGill et al. | 55/88 X |

*Primary Examiner*—Robert H. Spitzer
*Attorney, Agent, or Firm*—C. Clark Dougherty, Jr.

[57] ABSTRACT

An improved process for recovering hydrocarbons from an air-hydrocarbon vapor mixture such as the mixture of air and vaporized light hydrocarbon compounds expelled as a result of loading gasoline or the like into storage tanks and tank trucks. The air-hydrocarbon vapor mixture is caused to flow through a bed of solid adsorbent whereby the hydrocarbons are removed from the mixture and a residue gas stream comprised of substantially hydrocarbon-free air is produced. The substantially hydrocarbon-free air is vented to the atmosphere and a second bed of solid adsorbent having hydrocarbons adsorbed thereon is subjected to conditions which cause desorption of the hydrocarbons and thereby regeneration of the bed. The regeneration of the beds is accomplished by evacuating the beds with vacuum pumping whereby a major portion of the hydrocarbons are desorbed therefrom, subsequently introducing a small quantity of heated hydrocarbon-free air into the beds whereby additional hydrocarbons are stripped therefrom and then subjecting the bed to further evacuation by ejector jet pumping while continuing to evacuate the bed by vacuum pumping whereby yet additional hydrocarbons are desorbed therefrom. The air-hydrocarbon vapor mixture produced in the regeneration of the beds is contacted with a liquid absorbent whereby a major portion of the hydrocarbons are absorbed therefrom and recovered.

6 Claims, 1 Drawing Figure

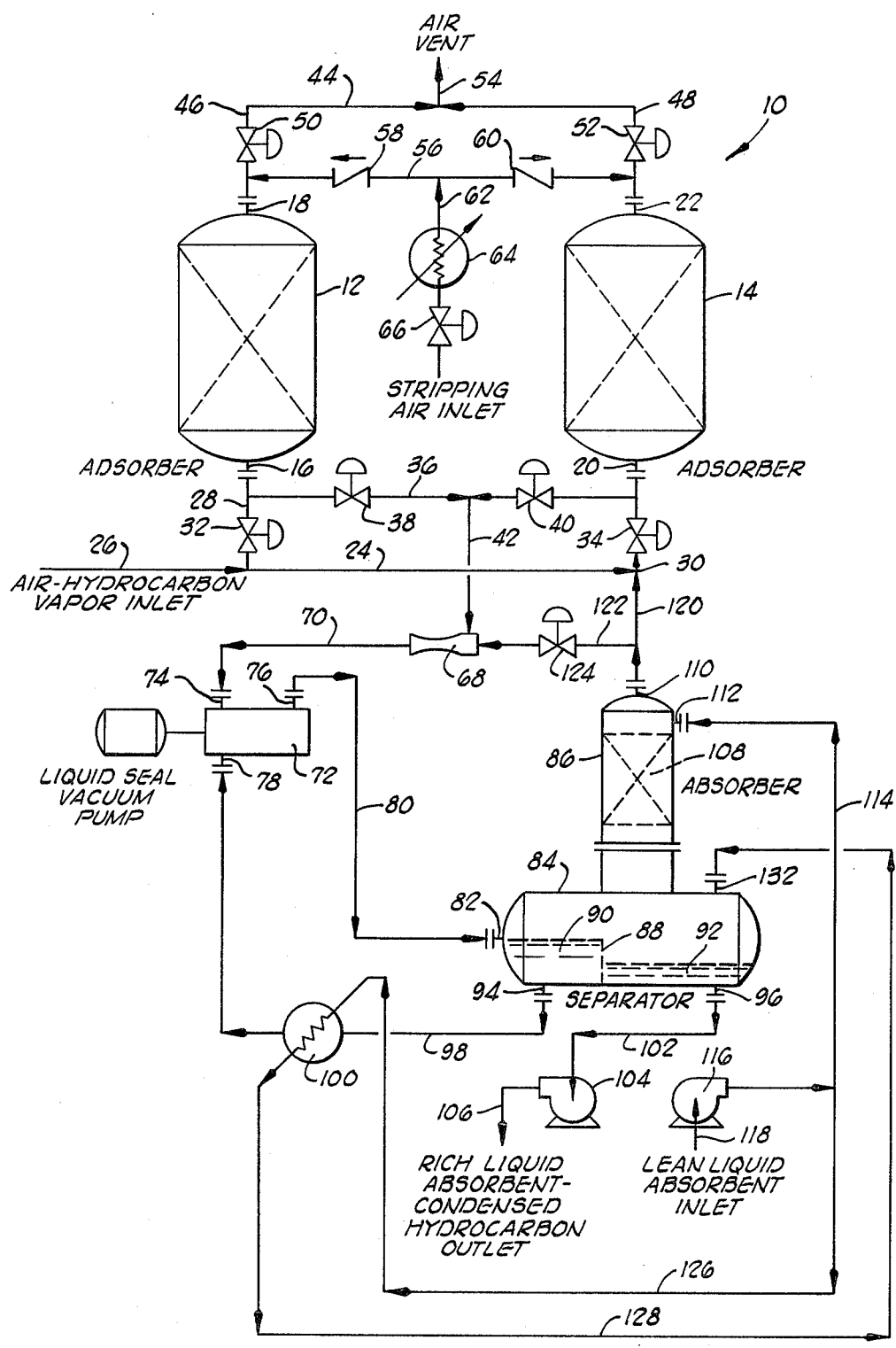

PROCESS FOR RECOVERING HYDROCARBONS WITH AIR-HYDROCARBON VAPOR MIXTURES

This is a continuation of application Ser. No. 046,765, filed June 8, 1979, now U.S. Pat. No. 4,261,716.

BACKGROUND OF THE INVENTION

1. Field of the Invention

The present invention relates to a process for recovering hydrocarbons from air-hydrocarbon vapor mixtures, and more particularly, but not by way of limitation, to an improved process for recovering vaporized gasoline light ends and the like from a mixture thereof with air expelled from tank trucks and the like.

2. Description of the Prior Art

In handling multicomponent hydrocarbon liquids such as gasoline, kerosene and the like, air-hydrocarbon vapor mixtures are readily produced which cannot be vented directly to the atmosphere due to the resulting pollution of the environment and fire and/or explosion hazard. Consequently, a variety of processes and apparatus have been developed and used for removing hydrocarbon vapors from such air-hydrocarbon vapor mixtures whereby the remaining air can be safely vented to the atmosphere. The removed hydrocarbons are generally liquefied and recombined with the hydrocarbon liquid from which they were vaporized thereby making their recovery economically advantageous.

A process for the recovery of light mixed hydrocarbon vapors from an air-hydrocarbon mixture expelled as a result of storage breathing or loading of a vented hydrocarbon vessel is described in U.S. Pat. No. 4,066,423. In accordance with such process, the air-hydrocarbon vapor mixture from which hydrocarbons are to be removed and recovered is passed through a bed of solid adsorbent having an affinity for hydrocarbons. As the mixture passes through the bed, a major portion of the hydrocarbons contained in the mixture are adsorbed on the bed and a residue gas stream is produced which is comprised of substantially hydrocarbon-free air. While a first bed of solid adsorbent is adsorbing hydrocarbons from the mixture, a second bed of solid adsorbent having hydrocarbons adsorbed thereon is regenerated by evacuation. The completeness of the regeneration of the solid adsorption beds of the process is dependent solely on the degree of vacuum produced in the beds by the vacuum pump utilized. Because vacuum pumps are incapable of achieving total vacuum, i.e., lowering the absolute pressure exerted on the beds to zero, a quantity of hydrocarbons are left adsorbed on the beds after regeneration which reduces the capacity of the beds to adsorb additional hydrocarbons and reduces the service life of the adsorbent.

The hydrocarbon-rich air-hydrocarbon mixture produced as a result of the regeneration of the bed is contacted with a liquid absorbent whereby hydrocarbons are removed therefrom and the residue gas stream from the absorption step is recycled to the bed through which the inlet air-hydrocarbon mixture is flowing. In accordance with the teachings of U.S. Pat. No. 4,066,423, the liquid absorbent utilized is liquid hydrocarbons condensed from the air-hydrocarbon vapor mixture produced in the evacuation regeneration step. More specifically, the hydrocarbon-rich air-hydrocarbon vapor mixture is cooled whereby portions of the hydrocarbons are condensed and such condensed hydrocarbons are circulated into contact with the remaining air-hydrocarbon vapor mixture whereby hydrocarbon vapors are absorbed by the liquids.

Numerous other processes and apparatus for recovering hydrocarbons from air-hydrocarbon vapor mixtures or otherwise treating said mixtures are disclosed in U.S. Pat. Nos. 3,897,193; 3,768,232; 3,867,111; 3,455,089; 3,543,484; and 3,776,283. In all of the prior processes which utilize solid adsorbent for removing hydrocarbons from air-hydrocarbon vapor mixtures, regeneration of the adsorbent is incomplete whereby hydrocarbons are left on the adsorbent reducing the capacity, efficiency and service life thereof.

By the present invention, an improved process is provided which utilizes solid adsorbent for removing hydrocarbons and which achieves a more complete regeneration of the adsorbent than can be accomplished by prior processes thereby making the process more efficient, more economical to carry out and increasing the service life of the adsorbent used. In addition, by the process of the present invention, a stream of the liquid from which the hydrocarbon vapors originated is used to absorb the removed hydrocarbons in a simple and economical system thereby obviating the need for condensing the removed hydrocarbons using elaborate refrigeration or other similar apparatus which is expensive to install and operate.

SUMMARY OF THE INVENTION

An improved process for recovering hydrocarbons from an inlet air-hydrocarbon vapor mixture comprising flowing the inlet mixture through a first bed of solid adsorbent whereby hydrocarbons are adsorbed on the bed and a residue gas stream comprised of substantially hydrocarbon-free air which is vented to the atmosphere is produced. A second bed of solid adsorbent having hydrocarbons adsorbed thereon is evacuated and thereby regenerated by vacuum pumping whereby a major portion of the hydrocarbons are desorbed from the bed and a hydrocarbon-rich air-hydrocarbon mixture is produced. The second bed is more thoroughly regenerated by injection, under high vacuum conditions, of a small quantity of hydrocarbon-free air followed by further evacuation by ejector jet pumping whereby additional hydrocarbons are desorbed from the bed. The hydrocarbon-rich air-hydrocarbon mixture produced as a result of the evacuation of the second bed is contacted with a liquid absorbent whereby a major portion of the hydrocarbons are removed therefrom and a residue gas stream comprised of air and a minor portion of hydrocarbons is produced. The residue gas stream is combined with the inlet air-hydrocarbon mixture whereby it flows through the first adsorbent bed and hydrocarbons removed therefrom. The flow pattern of the inlet air-hydrocarbon mixture and the bed of solid adsorbent being evacuated are periodically changed whereby when the bed through which the inlet air-hydrocarbon mixture is flowing becomes loaded with adsorbed hydrocarbons, the inlet air-hydrocarbon mixture is caused to flow through the bed which has just been evacuated.

It is, therefore, a general object of the present invention to provide an improved process for recovering hydrocarbons from air-hydrocarbon vapor mixtures.

A further object of the present invention is the provision of a process whereby hydrocarbons contained in an air-hydrocarbon mixture are adsorbed on a bed of solid adsorbent and the bed is regenerated more completely than prior processes.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

In the drawing forming a part of this disclosure, apparatus for carrying out the process of this invention is illustrated diagrammatically.

DESCRIPTION OF PREFERRED EMBODIMENTS

Referring to the drawing, apparatus of the present invention is illustrated and generally designated by the numeral 10. The apparatus 10 is comprised of a pair of adsorbers 12 and 14, each of which contains a bed of solid adsorbent through which gases can flow. Each of the adsorbers 12 and 14 are closed vessels and include connections positioned on opposite sides of the beds of adsorbent contained therein. That is, the adsorber 12 includes inlet and outlet connections 16 and 18 and the adsorber 14 includes inlet and outlet connections 20 and 22. While various solid adsorbents having an affinity for hydrocarbons can be utilized in the adsorbers 12 and 14, activated carbon is preferred in that it is particularly suitable for adsorbing light hydrocarbon vapors of the type found in air-hydrocarbon vapor mixtures and for vacuum regeneration.

An air-hydrocarbon vapor mixture inlet header 24 is provided connected to a conduit 26 which conducts an air-hydrocarbon vapor mixture from a source thereof to the apparatus 10. A pair of conduits 28 and 30 are connected to the header 24 and to the connections 16 and 20 of the adsorbers 12 and 14, respectively. Conventional switching valves 32 and 34 are disposed in the conduits 28 and 30, respectively, and a header 36 is connected to the conduits 28 and 30 at points thereon between the switching valves 32 and 34 and the connections 16 and 20 of the adsorbers 12 and 14. A pair of switching valves 38 and 40 are disposed in the header 36 and a conduit 42 is connected to the header 36 at a point between the switching valves 38 and 40. A residue gas header 44 is provided, and a pair of conduits 46 and 48 are connected to the header 44 and to the connections 18 and 22 of the adsorbers 12 and 14. Switching valves 50 and 52 are disposed in the conduits 46 and 48, respectively, and a conduit 54 is connected to the header 44 between the valves 50 and 52 for venting residue gas to the atmosphere. A stripping air header 56 is provided connected to the conduits 46 and 48 at points thereon between the switching valves 50 and 52 and the connections 18 and 22 of the adsorbers 12 and 14. A pair of check valves 58 and 60 are disposed in the header 56 and a conduit 62 is connected to the header 56 at a point between the valves 58 and 60. An air heater 64 which can take various forms and a switching valve 66 are disposed in the conduit 62. The end of the conduit upstream from the switching valve 66 and heater 64 is left open to the atmosphere and a conventional air filter (not shown) is generally attached thereto for preventing solid impurities from entering the adsorbers. The open end of the conduit 54 can also include a flame arrestor (not shown).

The other end of the conduit 42 connected to the header 36 is connected to the suction connection of an ejector jet pump 68. The ejector jet pump 68 is of conventional design and includes a jet forming nozzle disposed within a suction chamber and a venturi-shaped diffuser (not shown). A suction connection is provided on the suction chamber, a discharge connection is provided on the end of the diffuser and an operating stream inlet connection is provided on the nozzle. In operation, an operating gas stream is caused to pass through the jet forming nozzle and into the diffuser which creates a suction in the suction chamber. The conduit 42 is connected to the suction chamber connection and the discharge connection of the ejector 68 is connected to a conduit 70. The conduit 70 is in turn connected to the suction connection of a vacuum pump 72.

While various types and designs of vacuum pumps can be utilized in accordance with the present invention, a conventional liquid seal vacuum pump, also known as a liquid ring vacuum pump, is preferred in that such a pump is capable of producing a high vacuum, is relatively inexpensive and is much safer in this type of service. The pump utilizes a seal liquid which is circulated through the pump. The seal liquid can be confined in a closed circuit and cooled which keeps the pump cool and cools the gas or gases flowing through the pump. The presence of the seal liquid in the pump precludes any possibility of explosions since the gas cannot approach its auto-ignition temperature nor can sparking occur due to mechanical failures within the pump.

The liquid seal vacuum pump 72 includes a suction connection 74 to which the conduit 70 is attached, a discharge connection 76 and a seal liquid inlet connection 78 for returning seal liquid thereto. A conduit 80 is connected to the discharge connection 76 of the pump 72 and to an inlet connection 82 of a separator 84. In a preferred embodiment, an absorber 86 is integrally connected to the top of the separator 84, but as will be understood, the absorber 86 and separator 84 can be separate vessels.

The separator 84 is a three phase separator capable of separating the seal liquid utilized for the pump 72, condensed hydrocarbons and an air-hydrocarbon vapor mixture from each other. Also, in the embodiment illustrated in the drawing, the separator 84 includes a chamber for accumulating separated condensed hydrocarbon liquids and hydrocarbon-rich liquid absorbent entering the separator 84 from the absorber 86 whereby such liquids are removed from the separator 84 in a combined state. More specifically, the separator 84 includes a weir 88 which divides the separator into a forward compartment 90 and a rearward compartment 92. The seal liquid and condensed hydrocarbon liquids entering the separator 84 by way of the inlet connection 82 are separated from the air-hydrocarbon vapor mixture in the forward compartment 90. The seal liquid is heavier than the condensed hydrocarbon liquids and is immiscible therewith, and consequently, the seal liquid accumulates in the bottom of the forward compartment 90 from where it is removed by way of a seal liquid outlet connection 94 attached to the separator 84. Condensed hydrocarbon liquids accumulating in the compartment 90 spill over the top of the weir 88 into the compartment 92. Hydrocarbon-rich liquid absorbent from the absorber 86 enters the compartment 92 by way of the open bottom of the absorber 86 connected to the top of the separator 84 and also accumulates in the compartment 92. The rich liquid absorbent-condensed hydrocarbon liquid mixture is removed from the separator 84 by way of an outlet connection 96. The separated air-hydrocarbon vapor mixture passes from the separator 84 into the absorber 86 by way of the connection therebetween.

A conduit 98 is connected to the seal liquid outlet connection 94 of the separator 84 and to the seal liquid inlet connection 78 of the pump 72. A cooler 100 is disposed in the conduit 98 for cooling the seal liquid as it flows therethrough. In certain situations a seal fluid circulation pump can be disposed in the conduit 98 between the separator 84 and the cooler 100. While the cooler 100 can be of various types and designs, a heat exchanger which cools the seal liquid by passing it in heat exchange relationship with a stream of lean liquid of the same characteristics as that used as the absorption medium in the absorber 86 is preferred and generally is the most economical.

A conduit 102 is connected to the connection 96 of the separator 84 and to a rich liquid absorbent-condensed hydrocarbon liquids pump 104. The discharge connection of the pump 104 is connected to a conduit 106 which leads the rich liquid absorbent-condensed hydrocarbon liquids mixture to a storage facility (not shown). It is preferred that designated facility for storage of the rich liquid absorbent be distinct from that for the lean liquid absorbent to insure lowest possible vapor pressure of the lean liquid absorbent thereby insuring optimum system performance efficiency.

The absorber 86 includes means disposed therein for bringing about intimate contact between a liquid absorbent flowing downwardly therein and a vapor mixture flowing upwardly therein. Such means can be comprised of vapor-liquid contact trays or any of a variety of conventional packing material. Preferably, the absorber 86 includes a section of packing material 108 disposed in the top portion thereof for bringing about such intimate contact. A residue gas outlet connection 110 and a lean liquid absorbent inlet connection 112 are provided above the packed section 108. As described above, in the embodiment shown in the drawing, the open bottom of the absorber 86 is sealingly connected to the top of the separator 84 over an opening in the separator 84 whereby rich liquid absorbent produced in the absorber 86 flows downwardly out of the absorber and into the separator 84. In a like manner, the mixture of air and hydrocarbons separated in the separator 84 flows upwardly to the open bottom of the absorber into contact with the liquid absorbent flowing downwardly therein whereby hydrocarbons are absorbed and removed from the vapor mixture and a residue gas stream comprised of air and a minor portion of hydrocarbons is produced.

A conduit 114 is connected to the lean liquid absorbent inlet 112 of the absorber 86 and to the discharge connection of a pump 116. A conduit 118 is connected to the suction connection of the pump 116 which leads a stream of lean liquid absorbent from a source thereof such as a storage tank to the pump 116. As indicated above, a conduit 126 can be provided to connect conduit 114 with cooler 100 whereby a slip stream of lean liquid absorbent can flow to an inlet connection 132 of the separator 84 by way of a conduit 128.

In certain cases, the lean liquid absorbent may be too warm to use directly as an absorbent and seal fluid coolant. In such cases, an exchanger (not shown) can be disposed in conduit 114 for cooling the lean liquid absorbent with an appropriate cooling medium such as cooling water, refrigerant, etc.

The residue gas stream produced in the absorber 86 exits the absorber by way of the connection 110 thereof and flows into a conduit 120 connected thereto and connected to the inlet air-hydrocarbon vapor header 24. A conduit 122 is connected to the conduit 120 and to the jet forming nozzle inlet connection of the ejector 68. A switching valve 124 is disposed in the conduit 122.

As will be understood by those skilled in the art, the switching valves 32, 34, 38, 40, 50, 52, 66 and 124 can be operated manually, but are preferably automatically operated valves which are controlled by a conventional cycle controller. The length of each cycle, i.e., the period of time between when the switching valves are operated can be controlled by a timer or other instrument sensing one or more variables in the operation of the apparatus 10, such as the degree of vacuum achieved in the adsorbent bed being regenerated, the composition of the gas stream being vented to the atmosphere, etc.

OPERATION OF THE APPARATUS 10

In operation of the apparatus 10, the switching valves 32, 34, 38, 40, 50 and 52 are operated in a manner whereby the inlet air-hydrocarbon vapor mixture is caused to flow through one of the adsorbers 12 or 14 while the other of the adsorbers is being regenerated. For example, during a first cycle, the switching valve 32 is open and the switching valve 34 closed whereby the inlet air-hydrocarbon vapor mixture flows into the adsorber 12 by way of the conduit 28, switching valve 32 and connection 16 of the adsorber 12. Because the switching valve 34 disposed in the conduit 30 is closed, the inlet air-hydrocarbon vapor mixture is prevented from entering the adsorber 14. The switching valve 50 disposed in the conduit 46 is open and the switching valve 52 disposed in the conduit 48 is closed whereby the residue gas stream produced in the adsorber 12 exits the adsorber 12 by way of the connection 18 thereof, the conduit 46 and the switching valve 50 and enters the header 44. From the header 44, the residue gas stream flows through the conduit 54 from where it is vented to the atmosphere. The switching valve 38 disposed in the header 36 is closed and the switching valve 40 disposed therein is open whereby the adsorbent bed within the adsorber 14 is communicated with the suction connection 74 of the vacuum pump 72 by way of the connection 20 of the adsorber 14, the header 36, the open switching valve 40, the conduit 42, the ejector 68 and the conduit 70. The switching valves 66 and 124 disposed in the conduits 62 and 122, respectively, are initially closed.

During the first part of the cycle when the switching valves are in the mode described above, the inlet air-hydrocarbon vapor mixture flows through the bed of adsorbent within the adsorber 12 whereby hydrocarbons are adsorbed on the bed and removed from the mixture. The residue gas produced which is comprised of substantially hydrocarbon-free air is vented to the atmosphere by way of the air vent 54. Simultaneously, the bed of adsorbent disposed within the adsorber 14 is evacuated by the liquid seal vacuum pump whereby hydrocarbons are desorbed therefrom. A hydrocarbon-rich air-hydrocarbon vapor mixture is withdrawn from the adsorbent bed within the adsorber 14 which flows through the vacuum pump 72. Cooled seal liquid, preferably water or a mixture of water and a substance which functions as an antifreeze agent in the winter and as an agent to lower seal fluid vapor pressure in the summer, e.g., ethylene glycol, flows into the vacuum pump 72 by way of the connection 78 thereof and is discharged by way of the discharge connection 76 with the air-hydrocarbon vapor mixture. The intimate contact of the air-hydrocarbon vapor mixture with the cool seal liquid while flowing through the vacuum pump 72 cools the vapor mixture and causes heavy hydrocarbons contained therein to be condensed. Thus, a stream of hydrocarbon-rich air-hydrocarbon vapor mixture containing both seal liquid and condensed hydrocarbon liquids exits the pump 72 and flows through the conduit 80 into the separator 84. While passing through the separator 84, the air-hydrocarbon vapor mixture, seal liquid and condensed hydrocarbon liquids are separated from each other. As previously described, the separated seal liquid flows from the separator 84 by way of the connection 94 thereof, the conduit 98 and the cooler 100 back into the vacuum pump 72. Thus, the seal liquid is continually circulated between the pump 72, the separator 84 and the cooler 100 while the pump 72 is operating.

The separated condensed hydrocarbon liquids spill over the weir 88 and flow into the compartment 92 of the separator 84 where they combine with rich liquid absorbent flowing into the compartment 92 from the absorber 86 and removed therefrom by way of the connection 96 thereof, the conduit 102 and the pump 104. From the pump 104, the rich liquid absorbent-condensed hydrocarbon liquids mixture is conducted by way of the conduit 106 to storage facilities or a point of further processing (not shown).

A stream of lean liquid absorbent is pumped from a source thereof by the pump 116 and flows by way of the conduit 130, conduit 114 and connection 112 into the absorber 86. The lean liquid absorbent flows downwardly within the absorber 86 through the packed section 108 thereof and intimately contacts the separated air-hydrocarbon mixture flowing upwardly therethrough from the separator 84. As the air-hydrocarbon vapor mixture is contacted by the liquid absorbent, hydrocarbons are absorbed by the liquid absorbent and removed from the vapor mixture whereby a residue gas stream comprised of air and a minor portion of hydrocarbons is produced. The residue gas stream exits the absorber 86 by way of the connection 110 thereof and flows by way of the conduit 120 into the header 24 where it combines with the inlet air-hydrocarbon vapor mixture and flows through the adsorber 12. As will be understood, the hydrocarbons contained in the residue gas stream are adsorbed on the bed of adsorbent within the adsorber 12 along with hydrocarbons from the inlet air-hydrocarbon vapor mixture.

During a latter part of the cycle, after a major portion of hydrocarbons adsorbed on the bed of adsorbent within the adsorber 14 have been desorbed therefrom by the operation of the vacuum pump 72, i.e., the initial evacuation of the adsorber 14, the switching valve 66 in the conduit 62 is opened whereby a relatively small quantity of hydrocarbon-free air from the atmosphere enters the conduit 62, flows through the heater 64 so that it is heated and then flows by way of the header 56, the check valve 60 and the connection 22 of the adsorber 14 into the adsorber 14. The heated hydrocarbon-free air flows through the bed of adsorbent contained in the adsorber 14 and is withdrawn therefrom by the vacuum pump 72 as previously described. The introduction of a quantity of heated hydrocarbon-free air into the adsorbent bed contained within the adsorber 14 functions to strip additional hydrocarbons from the bed which were not desorbed therefrom by vacuum pumping, e.g., by the lowering of the pressure exerted on the bed to the degree of vacuum achieved by the vacuum pump 72.

Simultaneously with or after the required quantity of heated air has been introduced into the adsorber 14 to strip additional hydrocarbons therefrom the switching valve disposed in the conduit 62 is closed and the switching valve 124 disposed in the conduit 122 is opened. The opening of the switching valve 124 causes a portion of the residue gas stream produced in the absorber 86 to flow by way of the conduit 122 through the jet forming nozzle of the ejector 68 and into the vacuum pump 72. The jet of vapors flowing through the ejector 68 causes a suction to be produced which is in addition to the suction produced by the vacuum pump 72 exerted on the bed of adsorbent within the adsorber 14 which evacuates the adsorber further and causes additional hydrocarbons to be desorbed therefrom.

Thus, as will be apparent, the combination of initially evacuating the adsorber 14 by vacuum pumping, stripping the adsorbent bed with heated hydrocarbon-free air and then further evacuating the adsorbent bed brings about the regeneration of the bed to a greater degree than is possible by vacuum pumping alone. This more complete regeneration of the bed increases the capacity of the bed to adsorb additional hydrocarbons, increases the overall efficiency of the apparatus 10 and increases the service life of the adsorbent.

After the adsorbent bed within the adsorber 14 has been fully regenerated and the adsorbent bed within the adsorber 12 loaded with hydrocarbons from the air-hydrocarbon vapor mixture flowing therethrough, the switching valve 124 in the conduit 122 is closed, the switching valve 66 is caused to remain closed and the other switching valves of the apparatus 10 are reversed. That is, the switching valves 32 and 50 are closed, the switching valves 34 and 52 are opened, the switching valve 38 is opened and the switching valve 40 is closed. This causes the flow pattern of the inlet air-hydrocarbon vapor mixture to be changed whereby the mixture flows through the regenerated adsorbent bed within the adsorber 14 and the residue gas therefrom to be vented to the atmosphere. The adsorbent bed within the adsorber 12 is simultaneously communicated with the vacuum pump 72 whereby it is evacuated and the switching valves 66 and 124 are opened during a latter part of the cycle as described above to strip the adsorbent bed within the adsorber 12 and further evacuate the adsorbent bed whereby additional hydrocarbons are desorbed therefrom.

As will be understood by those skilled in the art, the flow pattern of the inlet air-hydrocarbon vapor mixture and the bed being regenerated are continuously changed or cycled whereby when the adsorbent bed through which the inlet vapor mixture is flowing becomes loaded with adsorbed hydrocarbons, the inlet mixture is caused to flow into the bed which has just been regenerated. The hydrocarbon-rich air-hydrocarbon mixture produced from the bed being regenerated is continuously contacted with liquid absorbent in the absorber 86 whereby the hydrocarbons are recovered.

The apparatus 10 is particularly suitable for recovering vaporized gasoline light ends mixed with air produced as a result of loading gasoline into tank trucks and other vessels. In this application, the air-gasoline vapor mixture is processed in the apparatus 10 as described above and the liquid absorbent utilized is gasoline. That is, stored gasoline is pumped from a storage facility into the absorber 86 and the rich gasoline and condensed hydrocarbon liquids produced by the apparatus 10 are returned to the gasoline storage facility. Because the stored gasoline is continuously being loaded out of the storage facilities and replaced by newly produced gasoline, the stream of gasoline pumped to the absorber is lean enough to efficiently absorb gasoline light ends.

In order to more clearly illustrate the operation of the apparatus 10, the following example is given.

EXAMPLE

A typical gasoline truck loading terminal has the following loading pattern:

| | |
|---|---|
| Maximum Instantaneous Rate | 2200 gallons/minute |
| Maximum Throughput in 15 Minutes | 16500 gallons |
| Maximum Throughput in 1 Hour | 48000 gallons |
| Maximum Throughput in 4 Hours | 168000 gallons |
| Maximum Throughput Daily | 960000 gallons |

The gasoline loaded is deemed to have the following properties:

| | |
|---|---|
| Summer: | 10 psia RVP, 75° F. maximum |
| Winter: | 14 psia RVP, 10° F. minimum |

It is recognized that the hydrocarbon concentration of the air-hydrocarbon vapor generated by loading gasoline into the truck transports will vary according to gasoline volatility and the degree of air saturation attained.

Based on the above gasoline properties and other experience factors known to those skilled in the art, a design hydrocarbon concentration of 35 Vol.% is selected.

The apparatus 10 is designed for an approximately 15 minute cycle time, and consequently, it is necessary to design each adsorption vessel 12 and 14 to handle a net air-hydrocarbon vapor influent from the truck loading rack of 353 cubic feet per minute and 2647 cubic feet each cycle based on a 1.2 vapor growth factor. Approximately 9000 lbs. of the appropriate activated carbon is chosen and distributed equally in two 7 feet in diameter by approximately 8 feet high adsorption vessels 12 and 14. These two adsorption vessels are operated near ambient temperatures and only slightly above atmospheric pressure during the adsorption cycle.

A liquid ring vacuum pump 72 with a 30 horsepower electric motor is provided for regeneration of the beds of carbon after each adsorption cycle. Very effective regeneration of carbon beds 12 and 14 is accomplished each cycle by the introduction, under high vacuum conditions, of approximately 30 standard cubic feet of air heated to 200° to 300° F. The regeneration apparatus provided allows attainment of 49 millimeters of mercury absolute pressure each cycle with the vacuum pump 72 alone and with the vacuum assist ejector 68 an absolute pressure of 12 millimeters of mercury or less can easily be attained.

To accomplish the objective of recovery, concentrated hydrocarbon vapors containing only 5 to 20 Vol.% air are discharged from the vacuum pump 72 to a 2 feet diameter by approximately 12 feet high packed absorption column 86 integrally connected to a 3.5 feet diameter by approximately 8 feet long separator 84, where the major portion of the hydrocarbon vapors are absorbed and thereby recovered into a downward flowing stream of gasoline.

The minor portion of hydrocarbon vapors not immediately absorbed into the gasoline absorbent exits the top of the absorber 86. These hydrocarbons flow to whichever adsorber 12 or 14 is in the adsorption mode where they are adsorbed onto the activated carbon. Subsequently, during regeneration of the carbon, they are removed returning to the absorber 86. Eventually almost all of the hydrocarbon vapors are recovered.

Centrifugal pumps 104 and 116 each with 5 horsepower electric motor drivers are provided to circulate 125 gallons per minute of gasoline from storage facilities for purposes of providing the absorption medium in the absorber 86 and to provide the necessary seal fluid cooling medium in the seal fluid cooler 100.

Apparatus 10 designed as described above can be expected to remove and recover the hydrocarbon vapors generated from the transport loading rack such that less than 10 milligrams of hydrocarbons will be vented to the atmosphere per liter of gasoline loaded.

Thus, the present invention is well adapted to carry out the objects and attain the ends and advantages mentioned as well as those inherent therein. While presently preferred embodiments of the invention have been described for purposes of this disclosure, numerous changes in the arrangement of process steps and apparatus elements will suggest themselves to those skilled in the art, which changes are encompassed within the spirit of this invention as defined by the appended claims.

What is claimed is:

1. An improved process for recovering hydrocarbons from an inlet-air hydrocarbon mixture comprising the steps of:
    (a) flowing said inlet mixture through a first bed of activated carbon whereby said hydrocarbons in said mixture are adsorbed on said bed and a residue gas stream comprised of substantially hydrocarbon-free air is produced;
    (b) venting said substantially hydrocarbon-free air to the atmosphere;
    (c) evacuating a second bed of activated carbon having hydrocarbons adsorbed thereon by subjecting said bed to pumping with a liquid seal vacuum pump whereby a major portion of said hydrocarbons are desorbed from said bed and a hydrocarbon-rich air-hydrocarbon vapor mixture containing liquid from said liquid seal vacuum pump and condensed hydrocarbon liquids is produced;
    (d) introducing a quantity of hydrocarbon-free air into said second bed while continuing to evacuate said bed by pumping with said liquid seal vacuum pump whereby additional hydrocarbons are stripped from said bed and additional air-hydrocarbon vapor mixture containing liquid from said liquid seal vacuum pump and condensed hydrocarbon liquids is produced;
    (e) further evacuating said second bed by ejector jet pumping while continuing to evacuate said bed by pumping with said liquid seal vacuum pump whereby yet additional hydrocarbons are desorbed from said bed and additional air-hydrocarbon vapor mixture is produced;
    (f) separating the liquid from the liquid seal vacuum pump and the condensed hydrocarbon liquids from each other and from the air-hydrocarbon vapor mixture produced in steps (c), (d) and (e);

(g) cooling the separated liquid seal vacuum pump liquid by passing said liquid in heat exchange relationship with a stream of lean liquid absorbent;

(h) recycling the cooled liquid seal vacuum pump liquid to said liquid seal vacuum pump;

(i) contacting the air-hydrocarbon mixture separated in step (f) in an absorber with a lean liquid absorbent having an affinity for hydrocarbons whereby a major portion of the hydrocarbons are removed therefrom, a hydrocarbon-rich liquid absorbent is produced and a residue gas stream comprised of air and a minor portion of hydrocarbons is produced;

(j) utilizing a portion of said residue gas stream of step (i) for effecting the ejector jet pumping of step (e);

(k) combining the hydrocarbon liquids separated in step (f) with the hydrocarbon-rich liquid absorbent;

(l) combining the remaining of said residue gas stream produced in step (i) with said inlet air-hydrocarbon mixture of step (a) whereby hydrocarbons contained therein are adsorbed on said first bed of solid adsorbent; and (m) periodically changing the flow pattern of said inlet air-hydrocarbon mixture and changing the bed of activated carbon being evacuated and stripped whereby when the bed through which the inlet air-hydrocarbon mixture is flowing becomes loaded with adsorbed hydrocarbons, the inlet air-hydrocarbon mixture is caused to flow through the bed which has just been evacuated and stripped.

2. The process of claim 1 wherein the hydrocarbons contained in said inlet air-hydrocarbon mixture are vaporized gasoline light ends and the liquid absorbent utilized in step (i) is gasoline.

3. The process of claim 2 wherein the liquid seal vacuum pump liquid is water.

4. The process of claim 2 wherein the liquid seal vacuum pump liquid is a mixture of water and glycol.

5. The process of claim 2 wherein the hydrocarbon-free air utilized in step (d) is heated prior to introducing it into said bed.

6. The process of claim 2 wherein the source of lean gasoline utilized in step (i) is a gasoline storage facility and said mixture of hydrocarbon-rich gasoline and separated hydrocarbon liquids of step (j) are conducted back to said storage facility.

* * * * *